(12) United States Patent
Joseph et al.

(10) Patent No.: US 12,382,523 B2
(45) Date of Patent: Aug. 5, 2025

(54) CONTROL MESSAGE FOR DYNAMIC RADIO LINK CONTROL (RLC) ENTITY SELECTION

(71) Applicant: QUALCOMM Incorporated, San Diego, CA (US)

(72) Inventors: Vinay Joseph, Calicut (IN); Ruiming Zheng, Beijing (CN); Sitaramanjaneyulu Kanamarlapudi, San Diego, CA (US); Ozcan Ozturk, San Diego, CA (US); Rajat Prakash, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 905 days.

(21) Appl. No.: 17/593,373

(22) PCT Filed: Mar. 6, 2020

(86) PCT No.: PCT/CN2020/078100
§ 371 (c)(1),
(2) Date: Sep. 16, 2021

(87) PCT Pub. No.: WO2020/199847
PCT Pub. Date: Oct. 8, 2020

(65) Prior Publication Data
US 2022/0151002 A1  May 12, 2022

(30) Foreign Application Priority Data

Apr. 4, 2019  (WO) ................ PCT/CN2019/081440

(51) Int. Cl.
*H04W 4/00* (2018.01)
*H04L 1/1607* (2023.01)
(Continued)

(52) U.S. Cl.
CPC .......... *H04W 76/15* (2018.02); *H04L 1/1614* (2013.01); *H04L 69/14* (2013.01); *H04W 76/11* (2018.02); *H04W 76/12* (2018.02)

(58) Field of Classification Search
CPC ..... H04W 76/15; H04W 76/11; H04W 76/12; H04W 80/02
See application file for complete search history.

(56) References Cited

U.S. PATENT DOCUMENTS

2016/0234714 A1  8/2016  Basu Mallick et al.
2019/0053098 A1  2/2019  Jo et al.
(Continued)

FOREIGN PATENT DOCUMENTS

CN  108282823 A  7/2018
CN  108401484 A  8/2018
(Continued)

OTHER PUBLICATIONS

CMCC: "Considerations on PDCP Duplication Enhancements", 3GPP TSG-RAN WG2 Meeting #105bis, R2-1904358, 3rd Generation Partnership Project, Mobile Competence Centre, 650, Route Des Lucioles, F-06921 Sophia-Antipolis Cedex, vol. RAN WG2, No. Xi'an, China, Apr. 8-Apr. 12, 2019, Mar. 29, 2019, XP051693578, 7 Pages.
(Continued)

*Primary Examiner* — Omoniyi Obayanju
(74) *Attorney, Agent, or Firm* — Harrity & Harrity, LLP

(57) ABSTRACT

This disclosure provides systems, methods and apparatuses for using a media access control (MAC) control element (CE) for dynamic RLC entities selection. In one aspect, a base station (BS) may generate and transmit the control message to a user equipment (UE) to identify active radio link control (RLC) entities, a primary RLC entity, or other parameters relating to packet data convergence protocol
(Continued)

(PDCP) duplication-based communication. In this case, the UE may use the control message to select an RLC entity and may transmit protocol data units (PDUs) to the BS using a data radio bearer (DRB) and the selected RLC entity.

30 Claims, 13 Drawing Sheets

(51) Int. Cl.
  *H04L 69/14* (2022.01)
  *H04W 76/11* (2018.01)
  *H04W 76/12* (2018.01)
  *H04W 76/15* (2018.01)

(56) References Cited

U.S. PATENT DOCUMENTS

| | | | |
|---|---|---|---|
| 2020/0119976 A1* | 4/2020 | Xu | H04L 41/0668 |
| 2021/0112610 A1 | 4/2021 | Xiao et al. | |
| 2021/0297899 A1* | 9/2021 | Baek | H04W 48/16 |
| 2022/0015172 A1* | 1/2022 | Xu | H04L 5/0053 |

FOREIGN PATENT DOCUMENTS

| | | |
|---|---|---|
| CN | 108401505 A | 8/2018 |
| CN | 109151891 A | 1/2019 |
| EP | 3606274 A1 | 2/2020 |
| WO | WO-2018170891 A1 | 9/2018 |
| WO | WO-2018171546 A1 | 9/2018 |
| WO | 2018200565 A1 | 11/2018 |

OTHER PUBLICATIONS

Intel Corporation: "PDCP Duplication with Multiple RLC Entities", 3GPP TSG-RAN WG2 Meeting #105bis, R2-1903955, 3rd Generation Partnership Project, Mobile Competence Centre, 650, Route Des Lucioles, F-06921 Sophia-Antipolis Cedex, France, vol. RAN WG2, No. Xi'an, China, Apr. 8-Apr. 12, 2019, Mar. 29, 2019, XP051693190, 3 Pages.
Supplementary European Search Report—EP20783023—Search Authority—Berlin—Nov. 29, 2022.
Taiwan Search Report—TW109107646—TIPO—Oct. 25, 2023.
Ericsson: "MAC CE Format for PDCP Duplication", 3GPP TSG-RAN WG2 #105bis Tdoc, R2-1904062, Xi'an, China, Apr. 8-Apr. 12, 2019, 2 Pages.
Taiwan Search Report—TW109107646—TIPO—Mar. 23, 2023.
"3GPP TSG RAN Study on NR Industrial Internet of Things (IOT) (Release 16)" 3GPP TR 38.825 V1.0.0, Mar. 31, 2019 (Mar. 31, 2019) section 4.2.1, 32 pages.
Huawei, et al., "PDCP Duplication with More than Two RLC Channels", 3GPP TSG-RAN WG2#104, R2-1817510, Nov. 12, 2018 (Nov. 12, 2018), 3 pages, the whole document.
International Search Report and Written Opinion—PCT/CN2020/078100—ISA/EPO—May 28, 2020.
International Search Report and Written Opinion—PCT/CN2019/081440—ISA/EPO—Dec. 27, 2019.

* cited by examiner

| DRB ID indicator 1 | Active RLC entities indicator 1 | Primary active RLC entity indicator 1 | Number of copies indicator 1 |
| | Activation/deactivation indicator 1 | | |
| DRB ID indicator 2 | Active RLC entities indicator 2 | Primary active RLC entity indicator 2 | Number of copies indicator 2 |
| | Activation/deactivation indicator 2 | | |
| ⋮ | ⋮ | ⋮ | ⋮ |
| DRB ID indicator K | Active RLC entities indicator K | Primary active RLC entity indicator K | Number of copies indicator K |
| | Activation/deactivation indicator K | | |

FIGURE 4

| Bit 7 | Bit 6 | Bit 5 | Bit 4 | Bit 3 | Bit 2 | Bit 1 | Bit 0 |
|---|---|---|---|---|---|---|---|
| Reserved | Reserved | Reserved | $D_{1,4}$ | $D_{1,3}$ | $D_{1,2}$ | $D_{1,1}$ | $D_{1,0}$ |
| Reserved | Reserved | Reserved | Reserved | $R_{1,3}$ | $R_{1,2}$ | $R_{1,1}$ | $R_{1,0}$ |
| Reserved | Reserved | Reserved | $D_{2,4}$ | $D_{2,3}$ | $D_{2,2}$ | $D_{2,1}$ | $D_{2,0}$ |
| Reserved | Reserved | Reserved | Reserved | $R_{2,3}$ | $R_{2,2}$ | $R_{2,1}$ | $R_{2,0}$ |
| Reserved | Reserved | Reserved | $D_{K,4}$ | $D_{K,3}$ | $D_{K,2}$ | $D_{K,1}$ | $D_{K,0}$ |
| Reserved | Reserved | Reserved | Reserved | $R_{K,3}$ | $R_{K,2}$ | $R_{K,1}$ | $R_{K,0}$ |

FIGURE 5

| Bit 7 | Bit 6 | Bit 5 | Bit 4 | Bit 3 | Bit 2 | Bit 1 | Bit 0 |
|---|---|---|---|---|---|---|---|
| Reserved | Reserved | Reserved | $D_{1,4}$ | $D_{1,3}$ | $D_{1,2}$ | $D_{1,1}$ | $D_{1,0}$ |
| Reserved | Reserved | Reserved | Reserved | $R_{1,3}$ | $R_{1,2}$ | $R_{1,1}$ | $R_{1,0}$ |
| Reserved | Reserved | Reserved | Reserved | $P_{1,3}$ | $P_{1,2}$ | $P_{1,1}$ | $P_{1,0}$ |
| Reserved | Reserved | Reserved | $D_{2,4}$ | $D_{2,3}$ | $D_{2,2}$ | $D_{2,1}$ | $D_{2,0}$ |
| Reserved | Reserved | Reserved | Reserved | $R_{2,3}$ | $R_{2,2}$ | $R_{2,1}$ | $R_{2,0}$ |
| Reserved | Reserved | Reserved | Reserved | $P_{2,3}$ | $P_{2,2}$ | $P_{2,1}$ | $P_{2,0}$ |
| ⋮ | ⋮ | ⋮ | ⋮ | ⋮ | ⋮ | ⋮ | ⋮ |
| Reserved | Reserved | Reserved | $D_{K,4}$ | $D_{K,3}$ | $D_{K,2}$ | $D_{K,1}$ | $D_{K,0}$ |
| Reserved | Reserved | Reserved | Reserved | $R_{K,3}$ | $R_{K,2}$ | $R_{K,1}$ | $R_{K,0}$ |
| Reserved | Reserved | Reserved | Reserved | $P_{K,3}$ | $P_{K,2}$ | $P_{K,1}$ | $P_{K,0}$ |

| Bit 7 | Bit 6 | Bit 5 | Bit 4 | Bit 3 | Bit 2 | Bit 1 | Bit 0 |
|---|---|---|---|---|---|---|---|
| Reserved | Reserved | Reserved | $D_{1,4}$ | $D_{1,3}$ | $D_{1,2}$ | $D_{1,1}$ | $D_{1,0}$ |
| $N_{1,2}$ | $N_{1,1}$ | $N_{1,0}$ | Reserved | $R_{1,3}$ | $R_{1,2}$ | $R_{1,1}$ | $R_{1,0}$ |
| Reserved | Reserved | Reserved | $D_{2,4}$ | $D_{2,3}$ | $D_{2,2}$ | $D_{2,1}$ | $D_{2,0}$ |
| $N_{2,2}$ | $N_{2,1}$ | $N_{2,0}$ | Reserved | $R_{2,3}$ | $R_{2,2}$ | $R_{2,1}$ | $R_{2,0}$ |
| ⋮ | | | | | | | |
| Reserved | Reserved | Reserved | $D_{K,4}$ | $D_{K,3}$ | $D_{K,2}$ | $D_{K,1}$ | $D_{K,0}$ |
| $N_{K,2}$ | $N_{K,1}$ | $N_{K,0}$ | Reserved | $R_{K,3}$ | $R_{K,2}$ | $R_{K,1}$ | $R_{K,0}$ |

| Bit 7 | Bit 6 | Bit 5 | Bit 4 | Bit 3 | Bit 2 | Bit 1 | Bit 0 |
|---|---|---|---|---|---|---|---|
| $A_1$ | Reserved | Reserved | $D_{1,4}$ | $D_{1,3}$ | $D_{1,2}$ | $D_{1,1}$ | $D_{1,0}$ |
| Reserved | Reserved | Reserved | Reserved | $R_{1,3}$ | $R_{1,2}$ | $R_{1,1}$ | $R_{1,0}$ |
| $A_2$ | Reserved | Reserved | $D_{2,4}$ | $D_{2,3}$ | $D_{2,2}$ | $D_{2,1}$ | $D_{2,0}$ |
| Reserved | Reserved | Reserved | Reserved | $R_{2,3}$ | $R_{2,2}$ | $R_{2,1}$ | $R_{2,0}$ |
| ⋮ | | | | | | | |
| $A_3$ | Reserved | Reserved | $D_{K,4}$ | $D_{K,3}$ | $D_{K,2}$ | $D_{K,1}$ | $D_{K,0}$ |
| Reserved | Reserved | Reserved | Reserved | $R_{K,3}$ | $R_{K,2}$ | $R_{K,1}$ | $R_{K,0}$ |

FIGURE 10

| Bit 7 | Bit 6 | Bit 5 | Bit 4 | Bit 3 | Bit 2 | Bit 1 | Bit 0 |
|---|---|---|---|---|---|---|---|
| $A_1$ | Reserved | Reserved | $D_{1,4}$ | $D_{1,3}$ | $D_{1,2}$ | $D_{1,1}$ | $D_{1,0}$ |
| $N_{1,2}$ | $N_{1,1}$ | $N_{1,0}$ | Reserved | $R_{1,3}$ | $R_{1,2}$ | $R_{1,1}$ | $R_{1,0}$ |
| Reserved | Reserved | Reserved | Reserved | $P_{1,3}$ | $P_{1,2}$ | $P_{1,1}$ | $P_{1,0}$ |
| $A_2$ | Reserved | Reserved | $D_{2,4}$ | $D_{2,3}$ | $D_{2,2}$ | $D_{2,1}$ | $D_{2,0}$ |
| $N_{2,2}$ | $N_{2,1}$ | $N_{2,0}$ | Reserved | $R_{2,3}$ | $R_{2,2}$ | $R_{2,1}$ | $R_{2,0}$ |
| Reserved | Reserved | Reserved | Reserved | $P_{2,3}$ | $P_{2,2}$ | $P_{2,1}$ | $P_{2,0}$ |
| ⋮ | ⋮ | ⋮ | ⋮ | ⋮ | ⋮ | ⋮ | ⋮ |
| $A_K$ | Reserved | Reserved | $D_{K,4}$ | $D_{K,3}$ | $D_{K,2}$ | $D_{K,1}$ | $D_{K,0}$ |
| $N_{K,2}$ | $N_{K,1}$ | $N_{K,0}$ | Reserved | $R_{K,3}$ | $R_{K,2}$ | $R_{K,1}$ | $R_{K,0}$ |
| Reserved | Reserved | Reserved | Reserved | $P_{K,3}$ | $P_{K,2}$ | $P_{K,1}$ | $P_{K,0}$ |

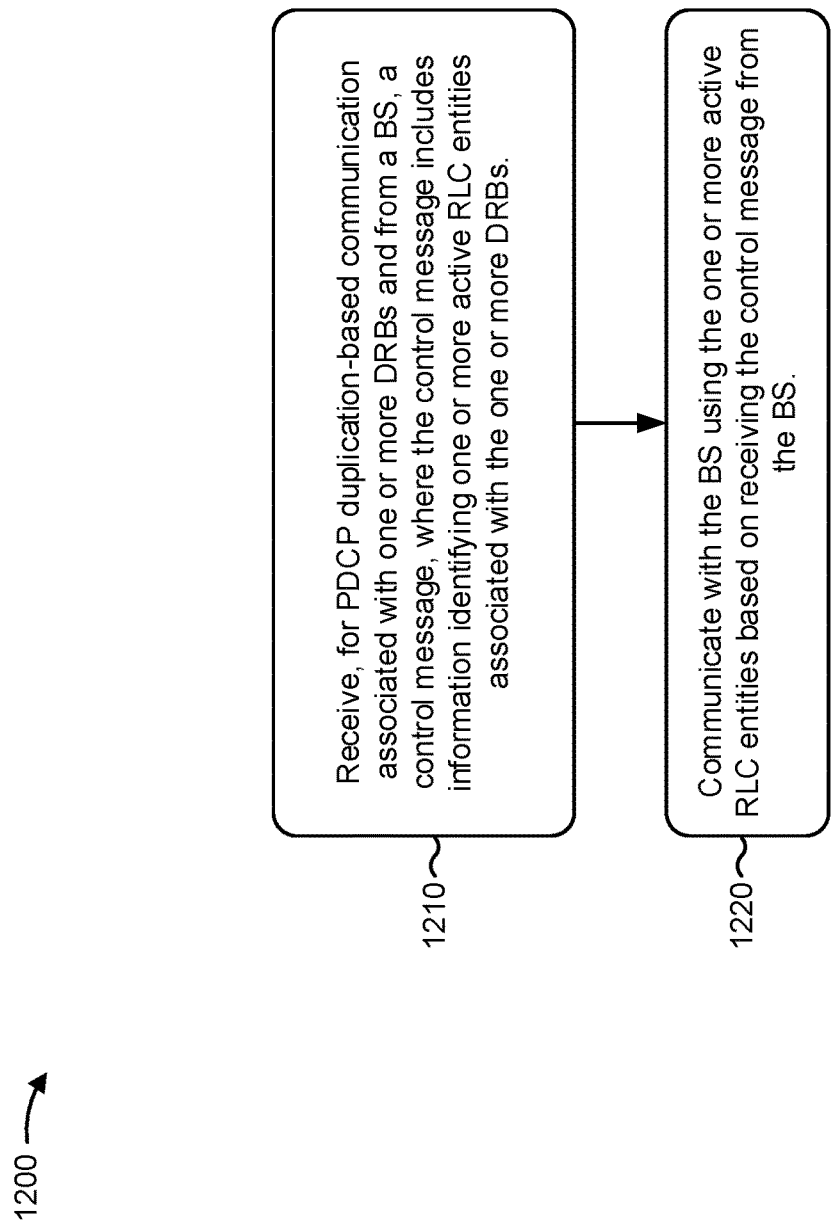

US 12,382,523 B2

CONTROL MESSAGE FOR DYNAMIC RADIO LINK CONTROL (RLC) ENTITY SELECTION

CROSS-REFERENCE TO RELATED APPLICATIONS

This Patent Application is a 371 national stage of PCT Application No. PCT/CN2020/078100 filed on Mar. 6, 2020, entitled "CONTROL MESSAGE FOR DYNAMIC RADIO LINK CONTROL (RLC) ENTITY SELECTION," which claims priority to Patent Cooperation Treaty (PCT) Application No. PCT/CN2019/081440, filed on Apr. 4, 2019, entitled "CONTROL MESSAGE FOR DYNAMIC RADIO LINK CONTROL (RLC) ENTITY SELECTION," and assigned to the assignee hereof. The disclosure of the prior Applications are considered part of and are incorporated by reference in this Patent Application.

TECHNICAL FIELD

Aspects of the present disclosure relate generally to wireless communication, and in particular to techniques for using a control message for dynamic radio link control (RLC) entity selection.

DESCRIPTION OF THE RELATED TECHNOLOGY

Wireless communication systems are widely deployed to provide various telecommunication services such as telephony, video, data, messaging, and broadcasts. Typical wireless communication systems may employ multiple-access technologies capable of supporting communication with multiple users by sharing available system resources (for example, bandwidth, transmit power, etc.). Examples of such multiple-access technologies include code division multiple access (CDMA) systems, time division multiple access (TDMA) systems, frequency-division multiple access (FDMA) systems, orthogonal frequency-division multiple access (OFDMA) systems, single-carrier frequency-division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless communication network may include a number of base stations (BSs) that can support communication for a number of user equipment (UEs). A user equipment (UE) may communicate with a base station (BS) via the downlink (DL) and uplink (UL). The DL (or forward link) refers to the communication link from the BS to the UE, and the UL (or reverse link) refers to the communication link from the UE to the BS. As will be described in more detail herein, a BS may be referred to as a NodeB, an LTE evolved nodeB (eNB), a gNB, an access point (AP), a radio head, a transmit receive point (TRP), a New Radio (NR) BS, or a 5G NodeB.

The above multiple access technologies have been adopted in various telecommunication standards to provide a common protocol that enables different UEs to communicate on a municipal, national, regional, and even global level. NR, which also may be referred to as 5G, is a set of enhancements to the LTE mobile standard promulgated by the Third Generation Partnership Project (3GPP). NR is designed to better support mobile broadband Internet access by improving spectral efficiency, lowering costs, improving services, making use of new spectrum, and better integrating with other open standards using OFDM with a cyclic prefix (CP) (CP-OFDM) on the DL, using CP-OFDM or SC-FDM (for example, also known as discrete Fourier transform spread OFDM (DFT-s-OFDM)) on the UL (or a combination thereof), as well as supporting beamforming, multiple-input multiple-output (MIMO) antenna technology, and carrier aggregation.

SUMMARY

The systems, methods and devices of this disclosure each have several innovative aspects, no single one of which is solely responsible for the desirable attributes disclosed herein.

One innovative aspect of the subject matter described in this disclosure can be implemented in a method of wireless communication performed by an apparatus of a user equipment (UE). The method may include receiving, for packet data convergence protocol (PDCP) duplication-based communication associated with one or more data radio bearers (DRBs) and from a base station (BS), a control message, where the control message includes information identifying one or more active radio link control (RLC) entities associated with the one or more DRBs; and communicating with the BS using the one or more active RLC entities based on receiving the control message from the BS.

In some aspects, communicating with the BS includes transmitting a quantity of copies of a PDCP protocol data unit (PDU) based on the one or more active RLC entities. In some aspects, the control message includes information identifying the one or more DRBs corresponding to the one or more active RLC entities. In some aspects, the control message includes a bit identifier for identifying an activation or deactivation of PDCP duplication.

In some aspects, the control message includes an indicator of a quantity of copies of a PDCP protocol data unit (PDU). In some aspects, a length of the control message is based on a quantity of DRBs of the one or more DRBs for which PDCP duplication-based communication is configured. In some aspects, a subheader of the control message includes information identifying a length of the control message. In some aspects, a subheader of the control message includes information identifying the one or more active RLC entities. In some aspects, the control message includes a bitmap identifying the one or more active RLC entities.

In some aspects, the control message includes PDCP duplication configuration information for the one or more DRBs. In some aspects, the control message includes an indication of a primary RLC entity of the one or more active RLC entities. In some aspects, the control message includes a bitmap identifying a primary RLC entity and an associated DRB of the one or more DRBs. In some aspects, the UE is configured to determine a different primary RLC entity from the one or more active RLC entities. In some aspects, the control message is at least one of a media access control (MAC) control element (CE), an RLC control protocol data unit (PDU), or a PDCP control PDU.

Another innovative aspect of the subject matter described in this disclosure can be implemented in a UE for wireless communication. The UE may include memory and one or more processors operatively coupled to the memory. The memory and the one or more processors may be configured to receive, for PDCP duplication-based communication associated with one or more DRBs and from a BS, a control message, where the control message includes information identifying one or more active RLC entities associated with the one or more DRBs; and communicate with the BS using the one or more active RLC entities based on receiving the control message from the BS.

Another innovative aspect of the subject matter described in this disclosure can be implemented in a non-transitory computer-readable medium. The non-transitory computer-readable medium may store one or more instructions for wireless communication. The one or more instructions, when executed by one or more processors of a UE, may cause the one or more processors to receive, for PDCP duplication-based communication associated with one or more DRBs and from a BS, a control message, where the control message includes information identifying one or more active RLC entities associated with the one or more DRBs; and communicate with the BS using the one or more active RLC entities based on receiving the control message from the BS.

Another innovative aspect of the subject matter described in this disclosure can be implemented in an apparatus for wireless communication. The apparatus may include means for receiving, for PDCP duplication-based communication associated with one or more DRBs and from a BS, a control message, where the control message includes information identifying one or more active RLC entities associated with the one or more DRBs; and means for communicating with the BS using the one or more active RLC entities based on receiving the control message from the BS.

Another innovative aspect of the subject matter described in this disclosure can be implemented in a method of wireless communication performed by an apparatus of a BS. The method may include generating, for PDCP duplication-based communication using one or more DRBs with a UE, a control message, where the control message includes information identifying one or more active RLC entities associated with the one or more DRBs; transmitting the control message to the UE to identify the one or more active RLC entities; and communicating with the UE using the one or more active RLC entities.

In some aspects, communicating with the UE includes configuring the UE to transmit a quantity of copies of a PDCP PDU based on the one or more active RLC entities. In some aspects, the control message includes information identifying the one or more DRBs corresponding to the one or more active RLC entities. In some aspects, the control message includes a bit identifier for identifying an activation or deactivation of PDCP duplication. In some aspects, the control message includes an indicator of a quantity of copies of a PDCP PDU. In some aspects, a length of the control message is based on a quantity of DRBs for which PDCP duplication-based communication is configured.

In some aspects, a subheader of the control message includes information identifying a length of the control message. In some aspects, a subheader of the control message includes information identifying the one or more active RLC entities. In an eighth aspect, alone or in combination with any one or more of the first through seventh aspects, the control message includes a bitmap identifying the one or more active RLC entities. In some aspects, the control message includes PDCP duplication configuration information for the one or more DRBs.

In some aspects, the control message includes an indication of a primary RLC entity of the one or more active RLC entities. In some aspects, the control message includes a bitmap identifying a primary RLC entity and an associated DRB of the one or more DRBs. In some aspects, alone or in combination with any one or more of the first through eleventh aspects, the control message is at least one of a MAC CE, an RLC control PDU, or a PDCP control PDU.

Another innovative aspect of the subject matter described in this disclosure can be implemented in a BS for wireless communication. The BS may include memory and one or more processors operatively coupled to the memory. The memory and the one or more processors may be configured to generate, for PDCP duplication-based communication using one or more DRBs with a UE, a control message, where the control message includes information identifying one or more active RLC entities associated with the one or more DRBs; transmit the control message to the UE to identify the one or more active RLC entities; and communicate with the UE using the one or more active RLC entities.

Another innovative aspect of the subject matter described in this disclosure can be implemented in a non-transitory computer-readable medium. The non-transitory computer-readable medium may store one or more instructions for wireless communication. The one or more instructions, when executed by one or more processors of a BS, may cause the one or more processors to generate, for PDCP duplication-based communication using one or more DRBs with a UE, a control message, where the control message includes information identifying one or more active RLC entities associated with the one or more DRBs; transmit the control message to the UE to identify the one or more active RLC entities; and communicate with the UE using the one or more active RLC entities.

Another innovative aspect of the subject matter described in this disclosure can be implemented in an apparatus for wireless communication. The apparatus may include means for generating, for PDCP duplication-based communication using one or more DRBs with a UE, a control message, where the control message includes information identifying one or more active RLC entities associated with the one or more DRBs; means for transmitting the control message to the UE to identify the one or more active RLC entities; and means for communicating with the UE using the one or more active RLC entities.

Aspects generally include a method, apparatus, system, computer program product, non-transitory computer-readable medium, user equipment, base station, wireless communication device, and processing system as substantially described herein with reference to and as illustrated by the accompanying drawings.

Details of one or more implementations of the subject matter described in this disclosure are set forth in the accompanying drawings and the description below. Other features, aspects, and advantages will become apparent from the description, the drawings and the claims. Note that the relative dimensions of the following figures may not be drawn to scale.

BRIEF DESCRIPTION OF THE DRAWINGS

FIGS. 4-11 are diagrams illustrating examples of a control message and bitmaps thereof used for dynamic RLC entity selection.

FIG. 12 is a diagram illustrating an example process performed, for example, by a UE.

Like reference numbers and designations in the various drawings indicate like elements.

DETAILED DESCRIPTION

Figure 1:
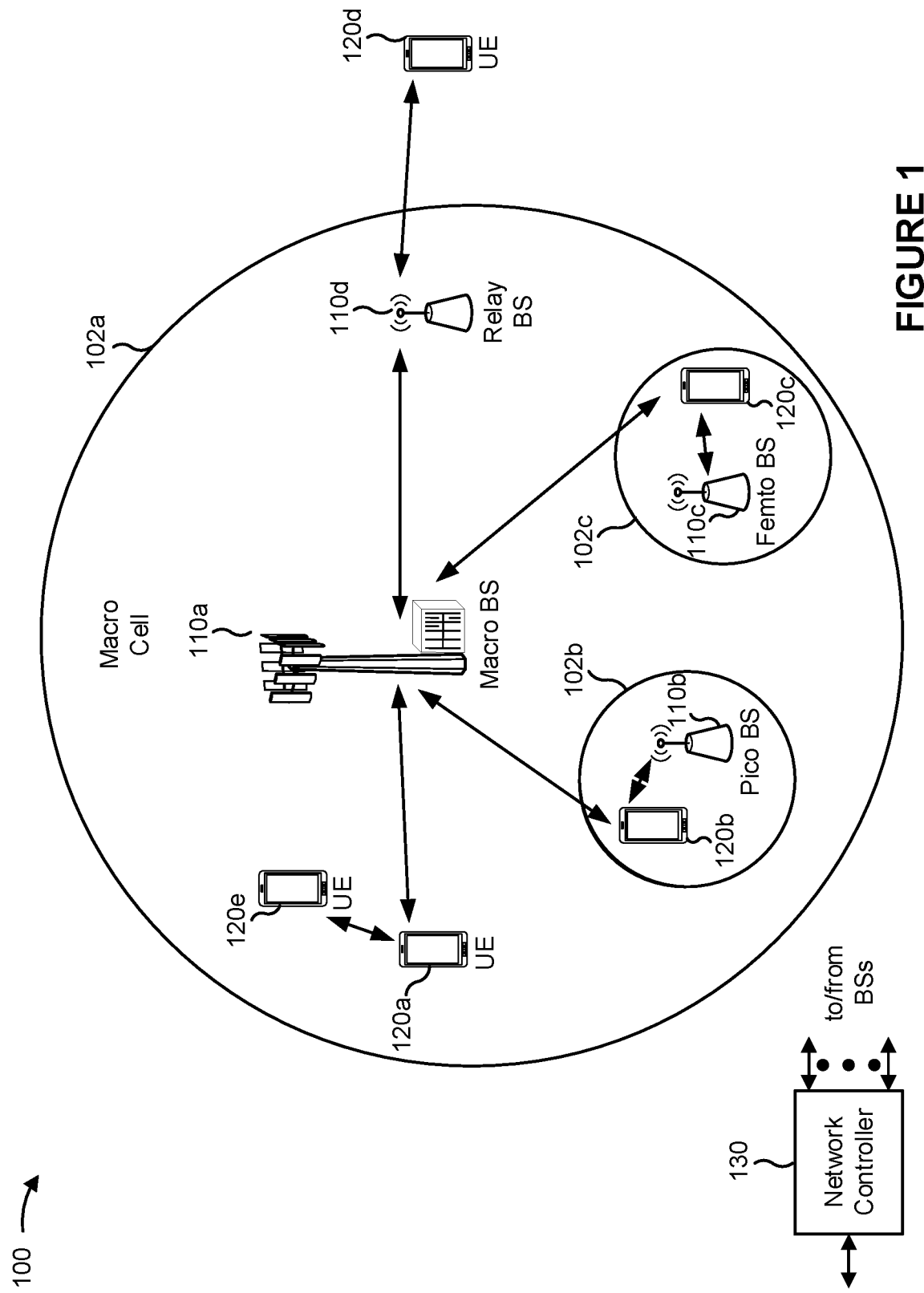
FIG. 1 is a block diagram conceptually illustrating an example of a wireless network.

The following description is directed to certain implementations for the purposes of describing the innovative aspects of this disclosure. However, a person having ordinary skill in the art will readily recognize that the teachings herein can be applied in a multitude of different ways. Some of the examples in this disclosure are based on wireless and wired local area network (LAN) communication according to the Institute of Electrical and Electronics Engineers (IEEE) 802.11 wireless standards, the IEEE 802.3 Ethernet standards, and the IEEE 1901 Powerline communication (PLC) standards. However, the described implementations may be implemented in any device, system or network that is capable of transmitting and receiving radio frequency signals according to any of the wireless communication standards, including any of the IEEE 802.11 standards, the Bluetooth® standard, code division multiple access (CDMA), frequency division multiple access (FDMA), time division multiple access (TDMA), Global System for Mobile communications (GSM), GSM/General Packet Radio Service (GPRS), Enhanced Data GSM Environment (EDGE), Terrestrial Trunked Radio (TETRA), Wideband-CDMA (W-CDMA), Evolution Data Optimized (EV-DO), 1×EV-DO, EV-DO Rev A, EV-DO Rev B, High Speed Packet Access (HSPA), High Speed Downlink Packet Access (HSDPA), High Speed Uplink Packet Access (HSUPA), Evolved High Speed Packet Access (HSPA+), Long Term Evolution (LTE), AMPS, or other known signals that are used to communicate within a wireless, cellular or internet of things (IOT) network, such as a system utilizing 3G, 4G or 5G, or further implementations thereof, technology.

In some communications systems, such as in New Radio (NR) with packet data convergence protocol (PDCP) duplication-based communication, a user equipment (UE) and a base station (BS) may communicate using a set of data radio bearers (DRBs). For example, the UE may transmit uplink data to the BS using a DRB associated with a first radio link control (RLC) entity and may duplicate the uplink data with a second RLC entity associated with the same DRB for transmission to the BS. In this case, the DRBs may be split DRBs where each associated RLC is in a common cell group or non-split DRBs where associated RLCs may be in multiple cell groups. Based on using PDCP duplication, the UE and the BS may achieve an improved reliability or reduced likelihood of dropped packets.

Some implementations of PDCP duplication enable up to four configured RLC entities. A BS may determine that one or more RLC entities are configured from a set of possible RLC configured entities, but current signaling may only provide a path for statically conveying information relating to the one or more RLC entities. Using static signaling may result in excessive latency to update information identifying which RLC entities are configured, which may result in poor network performance. Some aspects described herein may provide a control message, such as a media access control (MAC) control element (CE), that is used for dynamic selection of RLC entities for uplink PDCP duplication. For example, the MAC CE may include configuration information for a plurality of RLC entities and may include bitmaps for signaling parameters relating to the plurality of RLC entities. In another example, another type of control message may be used, such as an RLC control protocol data unit (PDU), a PDCP control PDU, or further examples of control messages.

Particular implementations of the subject matter described in this disclosure can be implemented to realize one or more of the following potential advantages. For example, some aspects described herein provide improved signaling for dynamic selection of RLC entities for uplink PDCP duplication. Moreover, some aspects described herein provide reduced latency associated with signaling a selection of an RLC entity as a primary RLC entity for uplink PDCP duplication, which may provide improved network performance relative to static signaling by enabling the UE and the BS to better adapt to changing channel conditions.

FIG. 1 is a block diagram conceptually illustrating an example of a wireless network 100. The wireless network 100 may be an LTE network or some other wireless network, such as a 5G or NR network. The wireless network 100 may include a number of BSs 110 (shown as BS 110a, BS 110b, BS 110c, and BS 110d) and other network entities. A BS is an entity that communicates with user equipment (UEs) and also may be referred to as a base station, a NR BS, a Node B, a gNB, a 5G node B (NB), an access point, or a transmit receive point (TRP). Each BS may provide communication coverage for a particular geographic area. In 3GPP, the term "cell" can refer to a coverage area of a BS, a BS subsystem serving this coverage area, or a combination thereof, depending on the context in which the term is used.

A BS may provide communication coverage for a macro cell, a pico cell, a femto cell, another type of cell, or a combination thereof. A macro cell may cover a relatively large geographic area (for example, several kilometers in radius) and may allow unrestricted access by UEs with service subscription. A pico cell may cover a relatively small geographic area and may allow unrestricted access by UEs with service subscription. A femto cell may cover a relatively small geographic area (for example, a home) and may allow restricted access by UEs having association with the femto cell (for example, UEs in a closed subscriber group (CSG)). A BS for a macro cell may be referred to as a macro BS. A BS for a pico cell may be referred to as a pico BS. A BS for a femto cell may be referred to as a femto BS or a home BS. In the example shown in FIG. 1, a BS 110a may be a macro BS for a macro cell 102a, a BS 110b may be a pico BS for a pico cell 102b, and a BS 110c may be a femto BS for a femto cell 102c. A BS may support one or multiple (for example, three) cells. The terms "eNB", "base station", "NR BS", "gNB", "TRP", "AP", "node B", "5G NB", and "cell" may be used interchangeably herein.

In some examples, a cell may not necessarily be stationary, and the geographic area of the cell may move according to the location of a mobile BS. In some examples, the BSs may be interconnected to one another as well as to one or more other BSs or network nodes (not shown) in the wireless network 100 through various types of backhaul interfaces, such as a direct physical connection, a virtual network, or a combination thereof using any suitable transport network.

Wireless network 100 also may include relay stations. A relay station is an entity that can receive a transmission of data from an upstream station (for example, a BS or a UE) and send a transmission of the data to a downstream station (for example, a UE or a BS). A relay station also may be a UE that can relay transmissions for other UEs. In the example shown in FIG. 1, a relay station 110d may communicate with macro BS 110*a* and a UE 120*d* in order to facilitate communication between BS 110*a* and UE 120*d*. A relay station also may be referred to as a relay BS, a relay base station, a relay, etc.

Wireless network 100 may be a heterogeneous network that includes BSs of different types, for example, macro BSs, pico BSs, femto BSs, relay BSs, etc. These different types of BSs may have different transmit power levels, different coverage areas, and different impacts on interference in wireless network 100. For example, macro BSs may have a high transmit power level (for example, 5 to 40 Watts) whereas pico BSs, femto BSs, and relay BSs may have lower transmit power levels (for example, 0.1 to 2 Watts).

A network controller 130 may couple to a set of BSs and may provide coordination and control for these BSs. Network controller 130 may communicate with the BSs via a backhaul. The BSs also may communicate with one another, for example, directly or indirectly via a wireless or wireline backhaul.

UEs 120 (for example, 120*a*, 120*b*, 120*c*) may be dispersed throughout wireless network 100, and each UE may be stationary or mobile. A UE also may be referred to as an access terminal, a terminal, a mobile station, a subscriber unit, a station, etc. A UE may be a cellular phone (for example, a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device or equipment, biometric sensors/devices, wearable devices (smart watches, smart clothing, smart glasses, smart wrist bands, smart jewelry (for example, smart ring, smart bracelet)), an entertainment device (for example, a music or video device, or a satellite radio), a vehicular component or sensor, smart meters/sensors, industrial manufacturing equipment, a global positioning system device, or any other suitable device that is configured to communicate via a wireless or wired medium.

Some UEs may be considered machine-type communication (MTC) or evolved or enhanced machine-type communication (eMTC) UEs. MTC and eMTC UEs include, for example, robots, drones, remote devices, sensors, meters, monitors, location tags, etc., that may communicate with a base station, another device (for example, remote device), or some other entity. A wireless node may provide, for example, connectivity for or to a network (for example, a wide area network such as Internet or a cellular network) via a wired or wireless communication link. Some UEs may be considered Internet-of-Things (IoT) devices or may be implemented as NB-IoT (narrowband internet of things) devices. Some UEs may be considered a Customer Premises Equipment (CPE). The UE 120 may be included inside a housing that houses components of the UE 120, such as processor components, memory components, similar components, or a combination thereof.

In general, any number of wireless networks may be deployed in a given geographic area. Each wireless network may support a particular RAT and may operate on one or more frequencies. A RAT also may be referred to as a radio technology, an air interface, etc. A frequency also may be referred to as a carrier, a frequency channel, etc. Each frequency may support a single RAT in a given geographic area in order to avoid interference between wireless networks of different RATs. In some cases, NR or 5G RAT networks may be deployed.

In some examples, access to the air interface may be scheduled, where a scheduling entity (for example, a base station) allocates resources for communication among some or all devices and equipment within the scheduling entity's service area or cell. Within the present disclosure, as discussed further below, the scheduling entity may be responsible for scheduling, assigning, reconfiguring, and releasing resources for one or more subordinate entities. That is, for scheduled communication, subordinate entities utilize resources allocated by the scheduling entity.

Base stations are not the only entities that may function as a scheduling entity. That is, in some examples, a UE may function as a scheduling entity, scheduling resources for one or more subordinate entities (for example, one or more other UEs). In this example, the UE is functioning as a scheduling entity, and other UEs utilize resources scheduled by the UE for wireless communication. A UE may function as a scheduling entity in a peer-to-peer (P2P) network, in a mesh network, or another type of network. In a mesh network example, UEs may optionally communicate directly with one another in addition to communicating with the scheduling entity.

Thus, in a wireless communication network with a scheduled access to time-frequency resources and having a cellular configuration, a P2P configuration, and a mesh configuration, a scheduling entity and one or more subordinate entities may communicate utilizing the scheduled resources.

In some aspects, two or more UEs 120 (for example, shown as UE 120*a* and UE 120*e*) may communicate directly using one or more sidelink channels (for example, without using a BS 110 as an intermediary to communicate with one another). For example, the UEs 120 may communicate using peer-to-peer (P2P) communications, device-to-device (D2D) communications, a vehicle-to-everything (V2X) protocol (which may include a vehicle-to-vehicle (V2V) protocol, a vehicle-to-infrastructure (V2I) protocol, or similar protocol), a mesh network, or similar networks, or combinations thereof. In this case, the UE 120 may perform scheduling operations, resource selection operations, as well as other operations described elsewhere herein as being performed by the BS 110.

Figure 2:
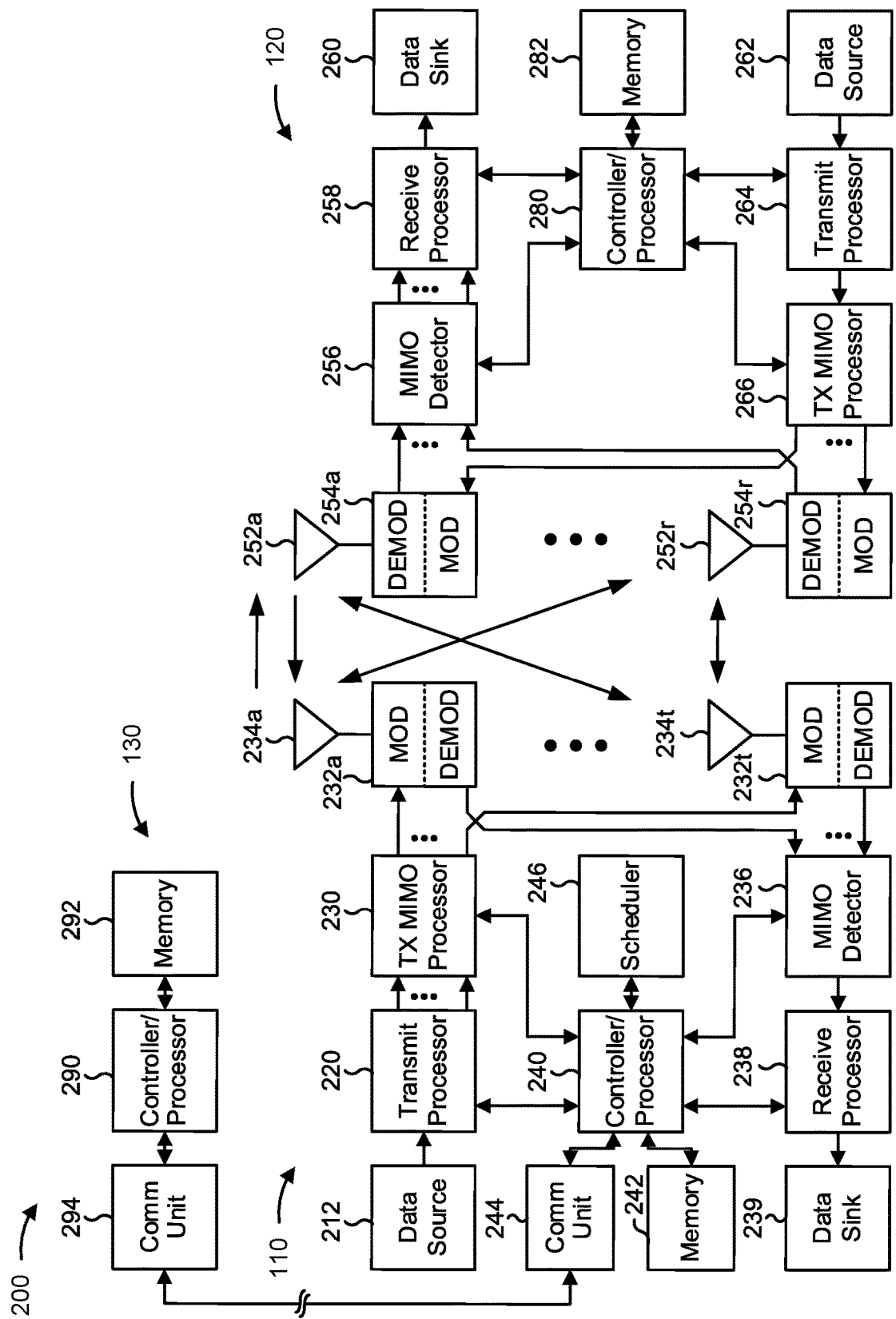
FIG. 2 is a block diagram conceptually illustrating an example of a base station (BS) in communication with a user equipment (UE) in a wireless network.

FIG. 2 is a block diagram conceptually illustrating an example 200 of a BS 110 in communication with a UE 120 in a wireless network. In some aspects, the BS 110 and the UE 120 may respectively be one of the BSs and one of the UEs in wireless network 100 of FIG. 1. The BS 110 may be equipped with T antennas 234*a* through 234*t*, and UE 120 may be equipped with R antennas 252*a* through 252*r*, where in general T≥1 and R≥1.

At the BS 110, a transmit processor 220 may receive data from a data source 212 for one or more UEs, select one or more modulation and coding schemes (MCS) for each UE based on channel quality indicators (CQIs) received from the UE, process (for example, encode and modulate) the data for each UE based on the MCS(s) selected for the UE, and provide data symbols for all UEs. The transmit processor 220 also may process system information (for example, for semi-static resource partitioning information (SRPI), etc.) and control information (for example, CQI requests, grants, upper layer signaling, etc.) and provide overhead symbols and control symbols. The transmit processor 220 also may generate reference symbols for reference signals (for example, the cell-specific reference signal (CRS)) and synchronization signals (for example, the primary synchronization signal (PSS) and secondary synchronization signal (SSS)). A transmit (TX) multiple-input multiple-output (MIMO) processor 230 may perform spatial processing (for example, precoding) on the data symbols, the control symbols, the overhead symbols, or the reference symbols, if applicable, and may provide T output symbol streams to T modulators (MODs) 232a through 232t. Each modulator 232 may process a respective output symbol stream (for example, for OFDM, etc.) to obtain an output sample stream. Each modulator 232 may further process (for example, convert to analog, amplify, filter, and upconvert) the output sample stream to obtain a downlink signal. T downlink signals from modulators 232a through 232t may be transmitted via T antennas 234a through 234t, respectively. According to various aspects described in more detail below, the synchronization signals can be generated with location encoding to convey additional information.

At the UE 120, antennas 252a through 252r may receive the downlink signals from the BS 110 or other base stations and may provide received signals to demodulators (DE-MODs) 254a through 254r, respectively. Each demodulator 254 may condition (for example, filter, amplify, downconvert, and digitize) a received signal to obtain input samples. Each demodulator 254 may further process the input samples (for example, for OFDM, etc.) to obtain received symbols. A MIMO detector 256 may obtain received symbols from all R demodulators 254a through 254r, perform MIMO detection on the received symbols if applicable, and provide detected symbols. A receive processor 258 may process (for example, demodulate and decode) the detected symbols, provide decoded data for UE 120 to a data sink 260, and provide decoded control information and system information to a controller or processor (controller/processor) 280. A channel processor may determine reference signal received power (RSRP), received signal strength indicator (RSSI), reference signal received quality (RSRQ), channel quality indicator (CQI), etc. In some aspects, one or more components of UE 120 may be included in a housing.

On the uplink, at the UE 120, a transmit processor 264 may receive and process data from a data source 262 and control information (for example, for reports including RSRP, RSSI, RSRQ, CQI, etc.) from controller/processor 280. Transmit processor 264 also may generate reference symbols for one or more reference signals. The symbols from transmit processor 264 may be precoded by a TX MIMO processor 266 if applicable, further processed by modulators 254a through 254r (for example, for DFT-s-OFDM, CP-OFDM, etc.), and transmitted to the BS 110. At the BS 110, the uplink signals from UE 120 and other UEs may be received by antennas 234, processed by demodulators 232, detected by a MIMO detector 236 if applicable, and further processed by a receive processor 238 to obtain decoded data and control information sent by UE 120. The receive processor 238 may provide the decoded data to a data sink 239 and the decoded control information to a controller or processor (i.e., controller/processor) 240. The BS 110 may include communication unit 244 and communicate to a network controller 130 via the communication unit 244. The network controller 130 may include a communication unit 294, a controller or processor (controller/processor) 290, and a memory 292.

The controller/processor 240 of the BS 110, the controller/processor 280 of UE 120, or any other component(s) of FIG. 2 may perform one or more techniques associated with using a control message for dynamic RLC entity selection, as described in more detail elsewhere herein. For example, the controller/processor 240 of the BS 110, the controller/processor 280 of the UE 120, or any other component(s) (or combinations of components) of FIG. 2 may perform or direct operations of, for example, process 1200 of FIG. 12, process 1300 of FIG. 13, or other processes as described herein. Memories 242 and 282 may store data and program codes for the BS 110 and the UE 120, respectively. A scheduler 246 may schedule UEs for data transmission on the downlink, the uplink, or a combination thereof.

The stored program codes, when executed by controller/processor 280 or other processors and modules at the UE 120, may cause the UE 120 to perform operations described with respect to process 1200 of FIG. 12 or other processes as described herein. The stored program codes, when executed by the controller/processor 240 or other processors and modules at the BS 110, may cause the BS 110 to perform operations described with respect to process 1300 of FIG. 13 or other processes as described herein. A scheduler 246 may schedule UEs for data transmission on the downlink, the uplink, or a combination thereof.

In some aspects, the UE 120 may include means for receiving, for packet data convergence protocol (PDCP) duplication-based communication associated with one or more data radio bearers (DRBs) and from a BS, a media access control (MAC) control element (CE) that includes information identifying one or more active radio link control (RLC) entities, or means for communicating with the base station using the one or more active RLC entities associated with the one or more DRBs based on receiving the control message from the BS. In some aspects, such means may include one or more components of UE 120 described in connection with FIG. 2.

In some aspects, the BS 110 may include means for generating, for PDCP duplication-based communication using one or more DRBs with a UE, control message, that includes information identifying one or more active RLC entities, means for transmitting the control message to the UE to identify the one or more active RLC entities, or means for communicating with the UE using the one or more active RLC entities. In some aspects, such means may include one or more components of BS 110 described in connection with FIG. 2.

While blocks in FIG. 2 are illustrated as distinct components, the functions described above with respect to the blocks may be implemented in a single hardware, software, or combination component or in various combinations of components. For example, the functions described with respect to the transmit processor 264, the receive processor 258, the TX MIMO processor 266, or another processor may be performed by or under the control of controller/processor 280.

Figure 3:
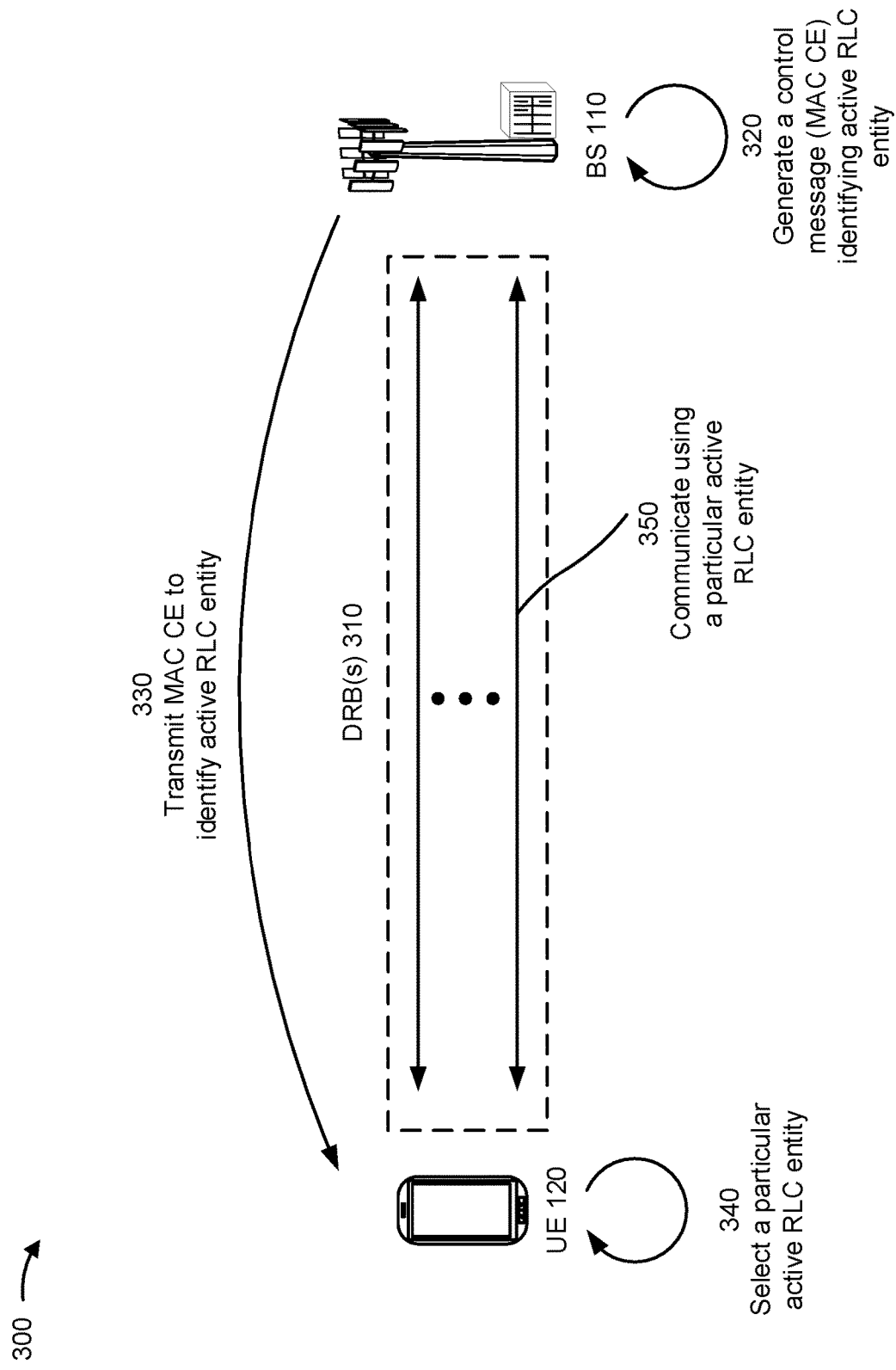
FIG. 3 is a diagram illustrating an example of using a control message for dynamic radio link control (RLC) entity selection.

FIG. 3 is a diagram illustrating an example 300 of using a control message for dynamic RLC entity selection. As shown in FIG. 3, the example 300 may include a UE 120 in communication with a BS 110 using a set of DRBs 310, which may be associated with a corresponding set of RLC entities. FIGS. 4-11 are examples of MAC CEs 400-1100, which may be used as control messages, and bitmaps thereof used for dynamic RLC entity selection.

As shown in FIG. 3, and by reference number 320, the BS 110 may generate a control message identifying one or more active RLC entities. For example, the BS 110 may generate the MAC CE with one or more indicators to point to one or more active RLC entities, such as a primary RLC entity or one or more other RLC entities, associated with one or more DRBs. For example, the BS 110 may generate a MAC CE including a bitmap identifying the primary RLC entity or identifying one or more other RLC entities from which the UE 120 may derive the primary RLC entity. Additionally, or alternatively, the BS 110 may generate another type of control message, such as an RLC control PDU or a PDCP control PDU. In some aspects, the MAC CE may include a plurality of indicators. For example, as described with regard to FIGS. 4-11, the MAC CE may include an indicator of an active RLC entity, a quantity of copies of data for transmission, a primary RLC entity, whether to activate or deactivate PDCP duplication for a particular DRB, or further examples of indicators of information.

As an example, as shown by FIG. 4, a MAC CE 400 may include a set of fields for identifying a set of active RLC entities associated with a DRB, a primary RLC entity associated with the DRB, whether to activate or deactivate uplink PDCP duplication for the DRB, and a quantity of copies of data that are to be transmitted during PDCP duplication on the DRB. For example, the MAC CE 400 may include information for identifying a set of DRBs 1 to K, which may correspond to the DRBs 310 of FIG. 3.

In some aspects, some of the fields of the MAC CE 400 may be optional fields. For example, fields for identifying the primary RLC entity, whether to activate or deactivate uplink PDCP duplication, and the quantity of copies may be designated as optional fields. In this case, the MAC CE 400 may include the fields, may exclude the fields, or may include an indicator of whether the MAC CE 400 includes or excludes the fields, for use in decoding by the UE 120.

In some aspects, the MAC CE 400 may be a concatenation of PDCP duplication configuration information for the one or more DRBs. For example, the MAC CE 400 may include PDCP duplication configuration information for a first DRB 1, a second DRB 2, and a kth DRB K, which may each be concatenated to form a single MAC CE 400. In some aspects, a length of the MAC CE 400 may be based on a quantity of DRBs for which PDCP duplication is being configured or reconfigured. As a result, in some aspects, the MAC CE 400 may include a subheader indicating a length of the MAC CE 400, to enable the UE 120 to decode the MAC CE 400. In some aspects, the MAC CE 400 may include a set of bitmaps, which may form part of the MAC CE 400. For example, as illustrated by FIGS. 5-11 and by MAC CEs 500-1100, the MAC CE 400 may include different configurations of bitmaps to identify different combinations of parameters.

As an example, as shown by FIG. 5, a MAC CE 500 may include duplication configuration information for a set of DRBs 1 to K. In this case, rows D may be set to indicate a DRB identifier (ID). For example, bits $D_{1,4}$ through $D_{1,0}$ may be a 5 bit identifier of the first DRB 1, $D_{2,4}$ through $D_{2,0}$ may be a 5 bit identifier of the second DRB 2, and $D_{K,4}$ through $D_{K,0}$ may be a 5 bit identifier of the kth DRB K. Additionally, rows R may be used to identify an active RLC entity associated with a DRB. For example, bits $R_{1,3}$ through $R_{1,0}$ may identify whether an RLC entity associated with the first DRB 1 is active or inactive. Similarly, bits $R_{2,3}$ through $R_{2,0}$ may identify active RLC entities for the second DRB 2, and bits $R_{K,3}$ through $R_{K,0}$ may identify active RLC entities for the kth DRB K. In this case, based on including 4 R bits, the MAC CE 500 may be used to identify whether each of 4 RLC entities associated with each DRB is active or inactive.

Figure 6:

As another example, as shown by FIG. 6, a MAC CE 600 may include 8 bit bitmaps to identify DRBs. In this case, rather than identifying a DRB ID as with the 5 bit bitmap of rows D in the MAC CE 500, a bit $D_{m,n}$ set to 1 rather than 0 may identify a DRB of index m+1. For example, bit $D_{1,2}$ being set to 1 may indicate that information associated therewith (bits of row $R_1$) is related to the third DRB configured for PDCP duplication. In this case, the third DRB may be determined based on ordering DRB IDs of DRBs sequentially.

Figure 7:

As another example, as shown by FIG. 7, a MAC CE 700 may include 5 bit identifiers of DRBs, with 3 bit identifiers of corresponding RLC entities in the same row. In this case, the MAC CE 700 includes 3 bits for identifying whether RLC entities are active. To accommodate 4 candidate RLC entities for a DRB, MAC CE 700 may omit a bit for identifying whether a primary RLC entity is active and, instead, include the 3 bits to identify whether non-primary RLC entities are active. In this case, the UE 120 may use a configured rule to resolve whether a primary RLC entity is active for a DRB. For example, the UE 120 may determine that a primary RLC is always active for a DRB.

As another example, as shown by FIG. 8, a MAC CE 800 may include an indication of a DRB using a 5 bit bitmap D and an indication of one or more active RLC entities using a 4 bit bitmap of row R. Additionally, the MAC CE 800 may include an indication of a primary RLC entity of the one or more active RLC entities using a 4 bit bitmap of row P. For example, one of bits $P_{1,3}$ through $P_{1,0}$ may be set to a value of 1 to indicate that a corresponding active RLC entity is set as a primary RLC entity of the first DRB 1. In this case, an ordering of active RLC entities identified by bits of a row P is the same as the ordering of active RLC entities identified by bits of the row R. For example, the active RLC entities may be ordered sequentially by an RLC identifier (ID).

Figure 9:

As another example, as shown by FIG. 9, a MAC CE 900 may include an indication of a quantity of copies of a PDCP protocol data unit (PDU) for a DRB associated with a particular PDCP duplication configuration. For example, the MAC CE 900 may include a set of bits N that indicate a quantity of copies for a corresponding DRB associated with bits D.

As another example, as shown by FIG. 10, a MAC CE 1000 may include a single bit to indicate whether to activate or deactivate PDCP duplication for a DRB associated with a particular PDCP duplication configuration. For example, the MAC CE 1000 may include a bit A that indicates whether to activate or deactivate PDCP duplication for a DRB identified by bits D.

As another example, as shown by FIG. 11, a MAC CE 1100 may include information identifying a DRB (bits D), information identifying one or more active RLC entities associated with the DRB (bits R), an indication of a primary RLC entity of the one or more active RLC entities (bits P), an indication of a quantity of copies for the DRB (bits N), and an indication of whether to activate or deactivate PDCP duplication (bits A).

Although some aspects are described herein in terms of a particular structure and usage of a bitmap, other indication structures and usage patterns may be possible.

Returning to FIG. 3, and as shown by reference number 330, the BS 110 may transmit the MAC CE to identify the active RLC entity. For example, the BS 110 may transmit a MAC CE having a format of MAC CEs 400-1100 or having another format to the UE 120 to identify a DRB 310 for communication, an active RLC entity of a DRB 310, a primary RLC entity of a DRB 310, a quantity of copies of data (a PDCP PDU) for transmission using the DRB 310, whether to activate or deactivate PDCP duplication on the DRB 310, or further examples of parameters for uplink PDCP duplication.

As further shown in FIG. 3, and by reference number 340, the UE 120 may select a particular active RLC entity. For example, the UE 120 may identify an active RLC entity for communication with the BS 110 using a DRB 310 based on the MAC CE. Additionally, or alternatively, the UE 120 may identify a primary RLC entity for a DRB 310. In some aspects, the UE 120 may select a set of RLC entities for use in communication with BS 110 on one or more DRBs 310.

In some aspects, the UE 120 may select the primary RLC entity for a DRB 310 from a set of active RLC entities. For example, when the MAC CE indicates that a primary RLC entity is not active, the UE 120 may select a new primary RLC entity for communication on a DRB 310. In this case, the UE 120 may select the new primary RLC entity based on a value of an identifier of an RLC entity, such as an RLC entity with a lowest identifier value. Additionally, or alternatively, the UE 120 may select the new primary RLC entity based on a channel condition associated with one or more cells of the new RLC entity.

As further shown in FIG. 3, and by reference number 350, the UE 120 may communicate with the BS 110 using a particular active RLC entity. For example, the UE 120 may transmit uplink data to the BS 110 using uplink PDCP duplication on a set of DRBs 310 associated with a set of active RLC entities. In this case, the UE 120 may transmit a quantity of copies of a PDCP PDU determined based on the MAC CE and using the set of active RLC entities.

FIG. 12 is a diagram illustrating an example process 1200 performed, for example, by a UE. The example process 1200 shows where the UE, such as the UE 120, performs operations associated with using a control message for dynamic RLC entity selection.

As shown in FIG. 12, in some aspects, the process 1200 may include receiving, for PDCP duplication-based communication associated with one or more DRBs and from a BS, a MAC CE, where the control message includes information identifying one or more active RLC entities associated with the one or more DRBs (block 1210). For example, the UE (using receive processor 258, transmit processor 264, controller/processor 280, or memory 282) may receive, for PDCP duplication-based communication associated with one or more DRBs and from a BS, a control message. In some aspects, the control message includes information identifying one or more active RLC entities associated with the one or more DRBs. In some aspects, the UE may include a first interface for receiving the control message.

As shown in FIG. 12, in some aspects, the process 1200 may include communicating with the BS using the one or more active RLC entities based on receiving the control message from the BS (block 1220). For example, the UE (using receive processor 258, transmit processor 264, controller/processor 280, or memory 282) may communicate with the BS using the one or more active RLC entities based on receiving the control message from the BS. In some aspects, the UE may include a second interface for communicating with the BS based on information included in the control message.

The process 1200 may include additional aspects, such as any single implementation or any combination of aspects described below or in connection with one or more other processes described elsewhere herein.

In a first aspect, communicating with the BS includes transmitting a quantity of copies of a PDCP PDU based on the one or more active RLC entities.

In a second aspect, alone or in combination with the first aspect, the control message includes information identifying the one or more DRBs corresponding to the one or more active RLC entities.

In a third aspect, alone or in combination with any one or more of the first and second aspects, the control message includes a bit identifier for identifying an activation or deactivation of PDCP duplication.

In a fourth aspect, alone or in combination with any one or more of the first through third aspects, the control message includes an indicator of a quantity of copies of a PDCP PDU.

In a fifth aspect, alone or in combination with any one or more of the first through fourth aspects, a length of the control message is based on a quantity of DRBs of the one or more DRBs for which PDCP duplication-based communication is configured.

In a sixth aspect, alone or in combination with any one or more of the first through fifth aspects, a subheader of the control message includes information identifying a length of the control message.

In a seventh aspect, alone or in combination with any one or more of the first through sixth aspects, a subheader of the control message includes information identifying the one or more active RLC entities.

In an eighth aspect, alone or in combination with any one or more of the first through seventh aspects, the control message includes a bitmap identifying the one or more active RLC entities.

In a ninth aspect, alone or in combination with any one or more of the first through eighth aspects, the control message includes PDCP duplication configuration information for the one or more DRBs.

In a tenth aspect, alone or in combination with any one or more of the first through ninth aspects, the control message includes an indication of a primary RLC entity of the one or more active RLC entities.

In an eleventh aspect, alone or in combination with any one or more of the first through tenth aspects, the control message includes a bitmap identifying a primary RLC entity and an associated DRB of the one or more DRBs.

In a twelfth aspect, alone or in combination with any one or more of the first through eleventh aspects, the UE is configured to determine a different primary RLC entity from the one or more active RLC entities.

In a thirteenth aspect, alone or in combination with any one or more of the first through twelfth aspects, the control message is at least one of a MAC CE, an RLC control PDU, or a PDCP control PDU.

Although FIG. 12 shows example blocks of the process 1200, in some aspects, the process 1200 may include additional blocks, fewer blocks, different blocks, or differently arranged blocks than those depicted in FIG. 12. Additionally, or alternatively, two or more of the blocks of the process 1200 may be performed in parallel.

Figure 13:
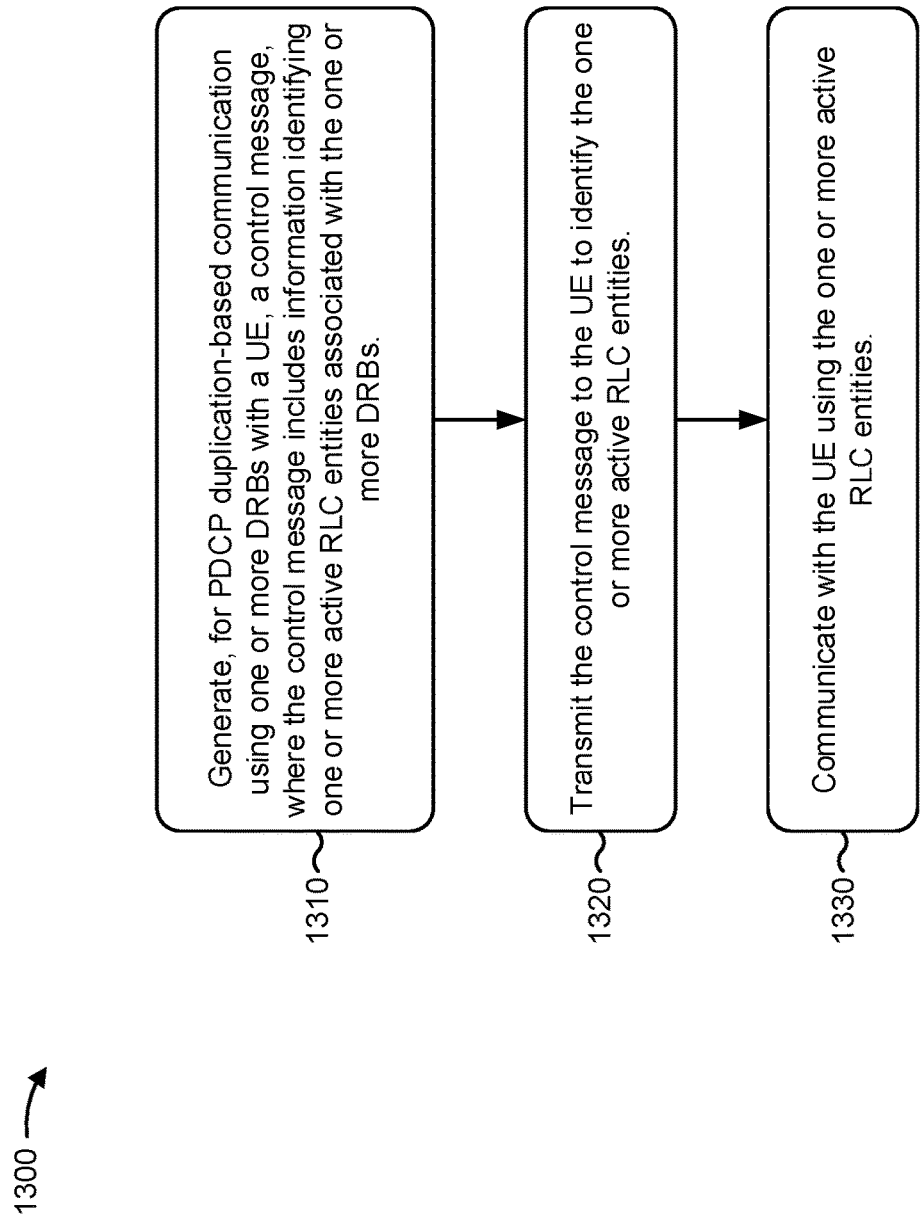
FIG. 13 is a diagram illustrating an example process performed, for example, by a BS.

FIG. 13 is a diagram illustrating an example process 1300 performed, for example, by a BS. The example process 1300 shows where the BS, such as the BS 110, performs operations associated with using a control message for dynamic RLC entity selection.

As shown in FIG. 13, in some aspects, the process 1300 may include generating, for PDCP duplication-based communication using one or more DRBs with a UE, a control message, where the control message includes information identifying one or more RLC entities associated with the one or more DRBs (block 1310). For example, the BS (using transmit processor 220, receive processor 238, controller/processor 240, or memory 242) may generate, for PDCP duplication-based communication using one or more DRBs with a UE, a control message. In some aspects, the control message includes information identifying one or more active RLC entities associated with the one or more DRBs. In some aspects, the BS includes a first interface for generating the control message.

As shown in FIG. 13, in some aspects, the process 1300 may include transmitting the control message to the UE to identify the one or more active RLC entities (block 1320). For example, the BS (using transmit processor 220, receive processor 238, controller/processor 240, or memory 242) may transmit the control message to the UE to identify the one or more active RLC entities. In some aspects, the BS includes a second interface for transmitting the control message to the UE.

As shown in FIG. 13, in some aspects, the process 1300 may include communicating with the UE using the one or more active RLC entities (block 1330). For example, the BS (using transmit processor 220, receive processor 238, controller/processor 240, or memory 242) may communicate with the UE using the one or more active RLC entities. In some aspects, the BS may include a third interface for communicating with the UE based on information included in the control message.

The process 1300 may include additional aspects, such as any single implementation or any combination of aspects described below or in connection with one or more other processes described elsewhere herein.

In a first aspect, communicating with the UE includes configuring the UE to transmit a quantity of copies of a PDCP PDU based on the one or more active RLC entities.

In a second aspect, alone or in combination with the first aspect, the control message includes information identifying the one or more DRBs corresponding to the one or more active RLC entities.

In a third aspect, alone or in combination with any one or more of the first and second aspects, the control message includes a bit identifier for identifying an activation or deactivation of PDCP duplication.

In a fourth aspect, alone or in combination with any one or more of the first through third aspects, the control message includes an indicator of a quantity of copies of a PDCP PDU.

In a fifth aspect, alone or in combination with any one or more of the first through fourth aspects, a length of the control message is based on a quantity of DRBs for which PDCP duplication-based communication is configured.

In a sixth aspect, alone or in combination with any one or more of the first through fifth aspects, a subheader of the control message includes information identifying a length of the control message.

In a seventh aspect, alone or in combination with any one or more of the first through sixth aspects, a subheader of the control message includes information identifying the one or more active RLC entities.

In an eighth aspect, alone or in combination with any one or more of the first through seventh aspects, the control message includes a bitmap identifying the one or more active RLC entities.

In a ninth aspect, alone or in combination with any one or more of the first through eighth aspects, the control message includes PDCP duplication configuration information for the one or more DRBs.

In a tenth aspect, alone or in combination with any one or more of the first through ninth aspects, the control message includes an indication of a primary RLC entity of the one or more active RLC entities.

In an eleventh aspect, alone or in combination with any one or more of the first through tenth aspects, the control message includes a bitmap identifying a primary RLC entity and an associated DRB of the one or more DRBs.

In a twelfth aspect, alone or in combination with any one or more of the first through eleventh aspects, the control message is at least one of a MAC CE, an RLC control PDU, or a PDCP control PDU.

Although FIG. 13 shows example blocks of the process 1300, in some aspects, the process 1300 may include additional blocks, fewer blocks, different blocks, or differently arranged blocks than those depicted in FIG. 13. Additionally, or alternatively, two or more of the blocks of the process 1300 may be performed in parallel.

The foregoing disclosure provides illustration and description, but is not intended to be exhaustive or to limit the aspects to the precise form disclosed. Modifications and variations may be made in light of the above disclosure or may be acquired from practice of the aspects.

As used herein, the term "component" is intended to be broadly construed as hardware, firmware, or a combination of hardware and software. As used herein, a processor is implemented in hardware, firmware, or a combination of hardware and software. As used herein, the phrase "based on" is intended to be broadly construed to mean "based at least in part on."

Some aspects are described herein in connection with thresholds. As used herein, satisfying a threshold may refer to a value being greater than the threshold, greater than or equal to the threshold, less than the threshold, less than or equal to the threshold, equal to the threshold, or not equal to the threshold.

As used herein, a phrase referring to "at least one of" a list of items refers to any combination of those items, including single members. As an example, "at least one of: a, b, or c" is intended to cover: a, b, c, a-b, a-c, b-c, and a-b-c.

The various illustrative logics, logical blocks, modules, circuits and algorithm processes described in connection with the aspects disclosed herein may be implemented as electronic hardware, computer software, or combinations of both. The interchangeability of hardware and software has been described generally, in terms of functionality, and illustrated in the various illustrative components, blocks, modules, circuits and processes described above. Whether such functionality is implemented in hardware or software depends upon the particular application and design constraints imposed on the overall system.

The hardware and data processing apparatus used to implement the various illustrative logics, logical blocks, modules and circuits described in connection with the aspects disclosed herein may be implemented or performed with a general purpose single- or multi-chip processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, or, any conventional processor, controller, microcontroller, or state machine. A processor also may be implemented as a combination of computing devices, for example, a combination of a DSP and a microprocessor, a plurality of microprocessors, one or more microprocessors in conjunction with a DSP core, or any other such configuration. In some aspects, particular processes and methods may be performed by circuitry that is specific to a given function.

In one or more aspects, the functions described may be implemented in hardware, digital electronic circuitry, computer software, firmware, including the structures disclosed in this specification and their structural equivalents thereof, or in any combination thereof. Aspects of the subject matter described in this specification also can be implemented as one or more computer programs, i.e., one or more modules of computer program instructions, encoded on a computer storage media for execution by, or to control the operation of, data processing apparatus.

If implemented in software, the functions may be stored on or transmitted over as one or more instructions or code on a computer-readable medium. The processes of a method or algorithm disclosed herein may be implemented in a processor-executable software module which may reside on a computer-readable medium. Computer-readable media includes both computer storage media and communication media including any medium that can be enabled to transfer a computer program from one place to another. A storage media may be any available media that may be accessed by a computer. By way of example, and not limitation, such computer-readable media may include RAM, ROM, EEPROM, CD-ROM or other optical disk storage, magnetic disk storage or other magnetic storage devices, or any other medium that may be used to store desired program code in the form of instructions or data structures and that may be accessed by a computer. Also, any connection can be properly termed a computer-readable medium. Disk and disc, as used herein, includes compact disc (CD), laser disc, optical disc, digital versatile disc (DVD), floppy disk, and Blu-ray disc where disks usually reproduce data magnetically, while discs reproduce data optically with lasers. Combinations of the above should also be included within the scope of computer-readable media. Additionally, the operations of a method or algorithm may reside as one or any combination or set of codes and instructions on a machine readable medium and computer-readable medium, which may be incorporated into a computer program product.

Various modifications to the aspects described in this disclosure may be readily apparent to those skilled in the art, and the generic principles defined herein may be applied to other aspects without departing from the spirit or scope of this disclosure. Thus, the claims are not intended to be limited to the aspects shown herein, but are to be accorded the widest scope consistent with this disclosure, the principles and the novel features disclosed herein.

Additionally, a person having ordinary skill in the art will readily appreciate, the terms "upper" and "lower" are sometimes used for ease of describing the figures, and indicate relative positions corresponding to the orientation of the figure on a properly oriented page, and may not reflect the proper orientation of any device as implemented.

Certain features that are described in this specification in the context of separate aspects also can be implemented in combination in a single aspect. Conversely, various features that are described in the context of a single aspect also can be implemented in multiple aspects separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. Further, the drawings may schematically depict one more example processes in the form of a flow diagram. However, other operations that are not depicted can be incorporated in the example processes that are schematically illustrated. For example, one or more additional operations can be performed before, after, simultaneously, or between any of the illustrated operations. In certain circumstances, multitasking and parallel processing may be advantageous. Moreover, the separation of various system components in the aspects described above should not be understood as requiring such separation in all aspects, and it should be understood that the described program components and systems can generally be integrated together in a single software product or packaged into multiple software products. Additionally, other aspects are within the scope of the following claims. In some cases, the actions recited in the claims can be performed in a different order and still achieve desirable results.

What is claimed is:

1. A method of wireless communication performed at a user equipment (UE), comprising:
   obtaining, from a network node, a control message, associated with packet data convergence protocol (PDCP) duplication-based communication via one or more data radio bearers (DRBs), the control message including:
      a first field, comprising a five-bit identifier, identifying the one or more DRBs, and
      a second field, after the first field, comprising one or more additional bits corresponding to a plurality of non-primary radio link control (RLC) entities associated with the one or more DRBs; and
   communicating, after receiving the control message, with the network node using at least one non-primary RLC entity of the plurality of non-primary RLC entities.

2. The method of claim 1, wherein the second field further comprises one or more bitmaps identifying the plurality of non-primary RLC entities.

3. The method of claim 1, further comprising:
   identifying, based on the one or more additional bits, the at least one non-primary RLC entity from the plurality of non-primary RLC entities.

4. The method of claim 1, wherein the control message further includes an indicator of a quantity of copies of a PDCP protocol data unit (PDU).

5. The method of claim 1, wherein a length of the control message is based on a quantity of the one or more DRBs.

6. The method of claim 1, wherein communicating with the network node comprises:
   outputting one or more copies of a PDCP protocol data unit (PDU) via the one or more DRBs.

7. The method of claim 1, wherein the control message includes another bit identifier identifying an activation or a deactivation of PDCP duplication for a DRB of the one or more DRBs.

8. The method of claim 1, wherein a subheader of the control message includes information identifying a length of the control message.

9. The method of claim 1, wherein a subheader of the control message includes information identifying the plurality of non-primary RLC entities.

10. The method of claim 1, wherein the control message further includes PDCP duplication configuration information for the one or more DRBs.

11. The method of claim 1, wherein the control message is a media access control (MAC) control element (CE).

12. A method of wireless communication performed at a network node, comprising:
   generating a control message, associated with packet data convergence protocol (PDCP) duplication-based communication that uses one or more data radio bearers (DRBs), the control message including:

a first field, comprising a five-bit identifier, identifying the one or more DRBs, and
a second field, after the first field, comprising one or more additional bits corresponding to a plurality of non-primary radio link control (RLC) entities associated with the one or more DRBs;
outputting the control message to a user equipment (UE); and
communicating, after outputting the control message, with the UE using at least one non-primary RLC entity of the plurality of non-primary RLC entities.

13. The method of claim 12, wherein the control message further includes at least one of:
an indicator of a quantity of copies of a PDCP protocol data unit (PDU),
another bit identifier for identifying an activation or a deactivation of PDCP duplication for a DRB of the one or more DRBs, or
PDCP duplication configuration information for the one or more DRBs.

14. The method of claim 12, wherein the control message is a media access control (MAC) control element (CE).

15. The method of claim 12, wherein a length of the control message is based on a quantity of the one or more DRBs.

16. The method of claim 12, wherein a subheader of the control message includes at least one of information identifying a length of the control message or information identifying the plurality of non-primary RLC entities.

17. An apparatus for wireless communication, comprising:
one or more memories comprising instructions; and
one or more processors configured to execute the instructions and cause the apparatus to:
obtain, from a network node, a control message, associated with packet data convergence protocol (PDCP) duplication-based communication via one or more data radio bearers (DRBs), the control message including:
a first field, comprising a five-bit identifier, identifying the one or more DRBs, and
a second field, after the first field, comprising one or more additional bits corresponding to a plurality of non-primary radio link control (RLC) entities associated with the one or more DRBs; and
communicate, after receiving the control message, with the network node using at least one non-primary RLC entity of the plurality of non-primary RLC entities.

18. The apparatus of claim 17, wherein the control message further includes at least one of:
an indicator of a quantity of copies of a PDCP protocol data unit (PDU),
another bit identifier identifying an activation or a deactivation of PDCP duplication for a DRB of the one or more DRBs, or
PDCP duplication configuration information for the one or more DRBs.

19. The apparatus of claim 17, wherein the one or more processors are further configured to cause the apparatus to identify, based on the one or more additional bits, the at least one non-primary RLC entity from the plurality of non-primary RLC entities.

20. The apparatus of claim 17, wherein a length of the control message is based on a quantity of the one or more DRBs for which PDCP duplication-based communication is configured.

21. The apparatus of claim 17, wherein, to communicate with the network node, the one or more processors are configured to cause the apparatus to:
output one or more copies of a PDCP protocol data unit (PDU) via the one or more DRBs.

22. The apparatus of claim 17, wherein a subheader of the control message includes at least one of information identifying a length of the control message or information identifying the plurality of non-primary RLC entities.

23. The apparatus of claim 17, wherein the control message is a media access control (MAC) control element (CE).

24. An apparatus for wireless communication, comprising:
one or more memories comprising instructions; and
one or more processors configured to execute the instructions and cause the apparatus to:
generate a control message, associated with packet data convergence protocol (PDCP) duplication-based communication that uses one or more data radio bearers (DRBs) with a user equipment (UE), the control message including:
a first field, comprising a five-bit identifier, identifying the one or more DRBs, and
a second field, after the first field, comprising one or more additional bits corresponding to a plurality of non-primary radio link control (RLC) entities associated with the one or more DRBs;
output the control message to the UE; and
communicate, after generating the control message, with the UE using at least one non-primary RLC entity of the plurality of non-primary RLC entities.

25. The apparatus of claim 24, wherein the control message includes at least one of:
an indicator of a quantity of copies of a PDCP protocol data unit (PDU),
another bit identifier for identifying an activation or a deactivation of PDCP duplication for a DRB of the one or more DRBs, or
PDCP duplication configuration information for the one or more DRBs.

26. The apparatus of claim 24, wherein the control message further includes a quantity of copies of a PDCP protocol data unit (PDU).

27. The apparatus of claim 17, further comprising at least one receiver configured to receive the control message, wherein the apparatus is configured as a user equipment.

28. The apparatus of claim 24, further comprising at least one transmitter configured to transmit the control message, wherein the apparatus is configured as a network node.

29. The method of claim 1, wherein the one or more additional bits of the second field of the control message comprises a plurality of additional bits.

30. The method of claim 10, wherein the one or more additional bits of the second field of the control message comprises a plurality of additional bits.

* * * * *